United States Patent
Zou et al.

(10) Patent No.: US 11,997,993 B2
(45) Date of Patent: Jun. 4, 2024

(54) SMART AGRICULTURAL AUTOMATIC FEEDING DEVICE

(71) Applicant: Guangdong AIB Polytechnic College, Guangzhou (CN)

(72) Inventors: Xinyao Zou, Guangzhou (CN); Zhi Yang, Guangzhou (CN); Jiabao Qiu, Guangzhou (CN); Weihao Chen, Guangzhou (CN)

(73) Assignee: GUANGDONG AIB POLYTECHNIC COLLEGE, Guangzhou (CN)

( * ) Notice: Subject to any disclaimer, the term of this patent is extended or adjusted under 35 U.S.C. 154(b) by 0 days.

(21) Appl. No.: 18/321,406

(22) Filed: May 22, 2023

(65) Prior Publication Data

US 2023/0380388 A1   Nov. 30, 2023

(30) Foreign Application Priority Data

May 26, 2022   (CN) .......................... 202210579509.0

(51) Int. Cl.
*A01K 61/80*   (2017.01)

(52) U.S. Cl.
CPC .................................... *A01K 61/80* (2017.01)

(58) Field of Classification Search
CPC ........ A01K 61/80; A01K 61/85; A01K 63/00; A01K 63/003; A01K 63/006; A01K 63/04; A01K 63/042; A01K 63/047
USPC ......................................... 119/214, 230, 215
See application file for complete search history.

(56) References Cited

FOREIGN PATENT DOCUMENTS

| CN | 110432201 A | * | 11/2019 | ............. A01K 61/80 |
| CN | 112471035 A | * | 3/2021 | ............. A01K 61/80 |
| CN | 112970650 A | * | 6/2021 | ............. A01K 61/80 |

OTHER PUBLICATIONS

Guangdong AIB Polytechnic College (Applicant), Supplementary amendment for CN202210579509.0, w/ (allowed) replacement claims, Nov. 14, 2022.
CNIPA, Notification to grant patent right for invention in CN202210579509.0, dated Nov. 24, 2022.

* cited by examiner

*Primary Examiner* — Peter M Poon
*Assistant Examiner* — Danielle A Clerkley
(74) *Attorney, Agent, or Firm* — Zhigang Ma

(57) ABSTRACT

A smart agricultural automatic feeding device includes a feeding box, a weighing part is disposed in the feeding box and connected with a top of the feeding box; a separating part is disposed below the weighing part and rotatably connected to an inner wall of the feeding box, a feed end of the separating part is connected with a discharge end of weighing part; a delivery part is disposed below the separating part and includes delivery tubes arranged in parallel, the delivery tubes are fixed to the inner wall of the feeding box, feed ends of the delivery tubes are connected to the discharge end of the separating part and configured to be arranged correspondingly to a fish pond; an air supply part is disposed outside the feeding box and connected to the delivery tubes through a pressurized part, the pressurized part is in transmission connection with the separating part.

6 Claims, 3 Drawing Sheets

SMART AGRICULTURAL AUTOMATIC FEEDING DEVICE

TECHNICAL FIELD

The disclosure relates to the technical field of automatic fish feed feeding technology, in particular to a smart agricultural automatic feeding device.

BACKGROUND

With the development of science and technology, modern agriculture is increasingly reliant on the smart technology. In order to reduce human labor costs in the fishery culture, automatic feeding devices are usually used when feeding is required. Using the automatic feeding device makes the feeding more easily, and compared with human labor, the fish feed is evenly distributed, thus making it easier for the fish to eat.

However, the automatic feeding devices in the related art still have some problems. First of all, a feeding distance of the automatic feeding device is small, thus making the fish feed concentrated in a certain area, which is not conductive to fish eating. Secondly, the automatic feeding devices in the related art do not have weighing function, making it difficult for feeders to accurately weight the fish feed, which affects the feeding results.

SUMMARY

The purpose of the disclosure is to provide a smart agricultural automatic feeding device to solve the above problems in the related art. The feeding distance can be expanded, thereby facilitating fish to eat the fish feed, and the automatic feeding device can weigh the fish feed to meet the growth needs of fish.

In order to achieve the above purpose, the disclosure provides the following schemes. The disclosure provides a smart agricultural automatic feeding device, includes a feeding box, a weighing part, a separating part, a delivery part and an air supply part.

The weighing part is disposed in the feeding box and connected to the top of the feeding box.

The separating part is disposed below the weighing part, a feed end of the separating part is connected to a discharge end of the weighing part and the separating part is rotatably connected to an inner wall of the feeding box.

The delivery part is disposed below the separating part, the delivery part includes a plurality of delivery tubes arranged in parallel, the plurality of delivery tubes is fixed to the inner wall of the feeding box, a feed end of each of the plurality of delivery tubes is connected to a discharge end of separating part, and the discharge ends of the plurality of delivery tubes are configured to correspond to fish pond.

The air supply part is disposed outside the feeding box; the air supply part is connected to the plurality of delivery tubes through a pressurized part, and the pressurized part is in transmission connection with the separating part.

In an embodiment, the weighing part includes a storage box, a weighing scale, two movable cylinders, poll rods and baffles. The storage box is fixed to an inner wall of the top of the feeding box and connected to an outside of the feeding box through a feeding port, two walls of the storage box are respectively provided with discharge ports; the weighing scale is disposed in the storage box; the movable cylinders are fixedly connected to the top of the feeding box, the movable cylinders are electrically connected to the weighing scale; the pull rods are respectively fixedly connected to movable ends of the movable cylinders; the baffles are respectively fixedly connected to ends of the pull rods, and the baffles are disposed correspondingly to the discharge ports.

In an embodiment, the separating part includes a drive motor, a separating tube, a connecting rod and a plurality of separating rings. The drive motor is fixedly connected to an outer wall of the feeding box; the separating tube is rotatably connected to the feeding box; the connecting rod is fixedly connected to an output end of the drive motor, and an end of the connecting rod is fixedly connected to the separating tube; the plurality of separating rings are fixedly connected to an outer wall of the separating tube, each of the plurality of separating rings is provided with a separating hole, a feed end of the separating hole is connected to the separating tube, and a discharge end of the separating hole is connected to the delivery part.

In an embodiment, the separating parts further includes funnels, support rods and sealing caps, the funnels are disposed between the storage box and the separating tube, the funnels are fixed with an inner wall of the feeding box through the support rods, and feed ends of the funnels are disposed correspondingly with the discharge ports; the sealing caps are detachably connected with the separating tube, discharge ends of the funnels are connected to the separating tube through the sealing caps.

In an embodiment, the delivery part further includes a plurality of fixed rods and a plurality of connecting tubes. The plurality of delivery tubes are fixed to the inner wall of the feeding box through the plurality of fixed rods, the plurality of separating rings are disposed correspondingly with the plurality of delivery tubes, the separating holes of the plurality of separating rings are respectively connected with the plurality of delivery tubes through the plurality of connecting tubes, and the plurality of delivery tubes are rotatably connected with the plurality of separating rings.

In an embodiment, the delivery part further includes a plurality of spray tubes, the spray tubes are connected with discharge ends of the delivery tubes, discharge ends of the spray tubes pass through the feeding box and extend out of the feeding box, and the spray tubes are aslant disposed.

In an embodiment, the air supply part includes an air supply pump and a gas collection. The air supply pump is disposed to an outside of the feeding box; the gas collection box is fixedly connected with the inner wall of the feeding box, an air inlet end of the air collection box is connected with the air supply pump, air outlet ends of the air collection box are respectively connected with the plurality of delivery tubes, the pressurized part is disposed at air inlet ends of the plurality of delivery tubes, and the pressurized part is configured to block the plurality of delivery tubes.

In an embodiment, the pressurized part includes a blocking plate, a drive rod, a push plate, a compression spring, connecting rods, a top plate and a cam. The blocking plate is disposed in the air collection box and the blocking plate has a wedge-shaped structure; the drive rod is fixedly connected to a top of the blocking plate, an end of the drive rod extends out of a top of the air collection box; the push plate is fixedly connected to the end of the drive rod, the compression spring is sleeved on the drive rod, two ends of the compression spring are respectively fixedly to a bottom of the push plate and the top of the air collection box; the top plate is fixedly connected to a top of the push plate through the connecting rods, the cam is fixedly connected to the connecting rod, and the cam is in sliding contact with a bottom of the top plate.

In an embodiment, the separating tube is provided with a plurality of grooves, and the plurality of grooves are connected with the separating holes of the plurality of separating rings.

The disclosure can achieve the following technical effects:
1. By providing a weighing part, the fish feed entering the feeding box can be weighed, so as to accurately measure the weight of the fish feed. On the one aspect, it is convenient for manage feeding; on the other aspect, it can improve the feeding effect and avoid waste.
2. By providing a separating part to separate the fed fish feed, and providing the plurality of delivery tubes of the delivery part to deliver the fish feed in different areas, the speed of fish feed delivery can be increased while the area where the fish feed is delivered can be expanded.
3. By providing a pressurized part which is in transmission connection with the separating part, and a pressure of the air supply part is increased under the action of the pressurized part when the separating part is rotated. Therefore, when the air supply part injects air into the plurality of delivery tubes, the fish feed in the plurality of delivery tubes can be delivered to a longer distance, so as to increase the feeding range of the fish feed.

BRIEF DESCRIPTION OF DRAWINGS

In order to more clearly explain embodiments of the disclosure or technical schemes in the related art, the drawings needed in the embodiments will be briefly introduced below. Apparently, the accompanying drawings in the following description are only some of the embodiments of the disclosure. For those skilled in the art, other drawings may be obtained from these drawings without creative labor.

DESCRIPTION OF REFERENCE NUMERALS

Figure 1:
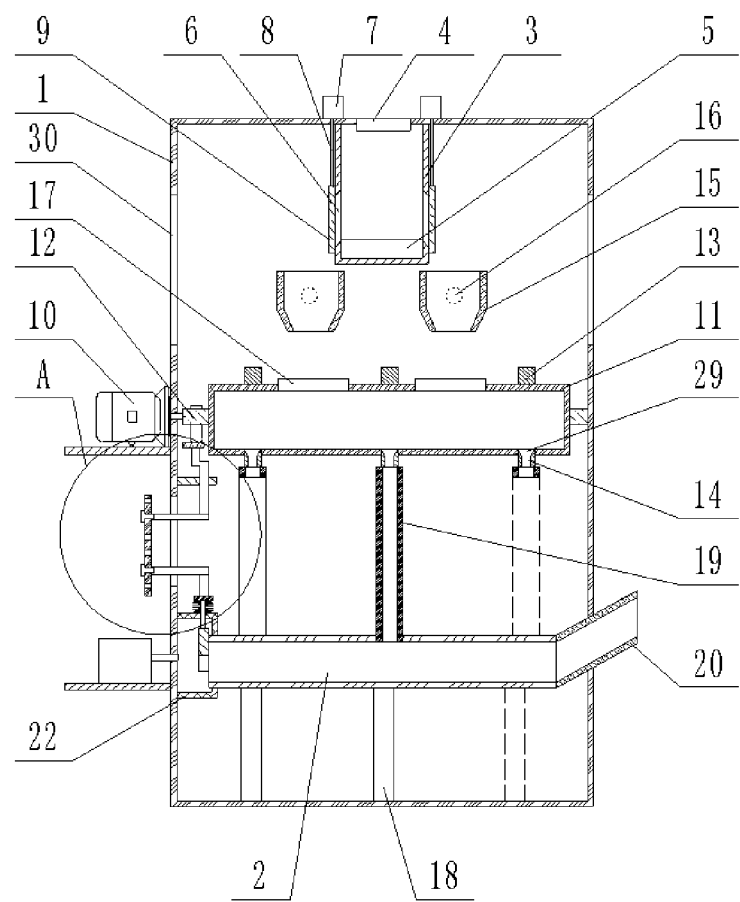
FIG. 1 is a schematic structural view of an automatic feeding device.
Figure 2:
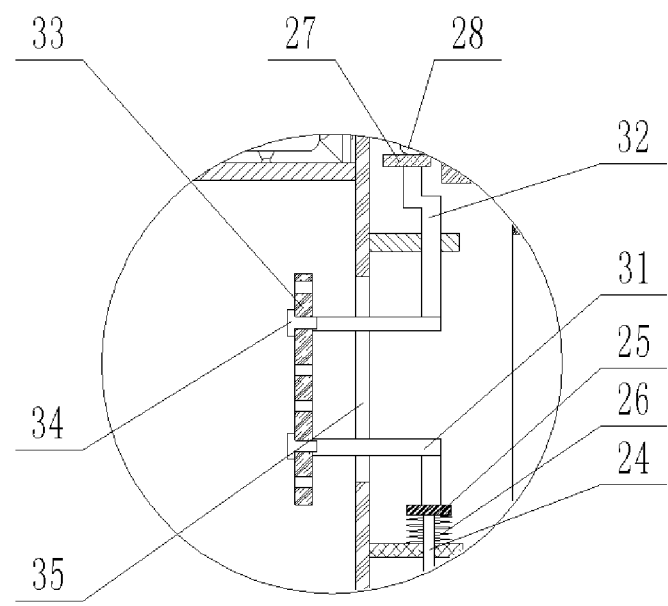
FIG. 2 is a partial enlarged view of a position A in FIG. 1.
Figure 3:
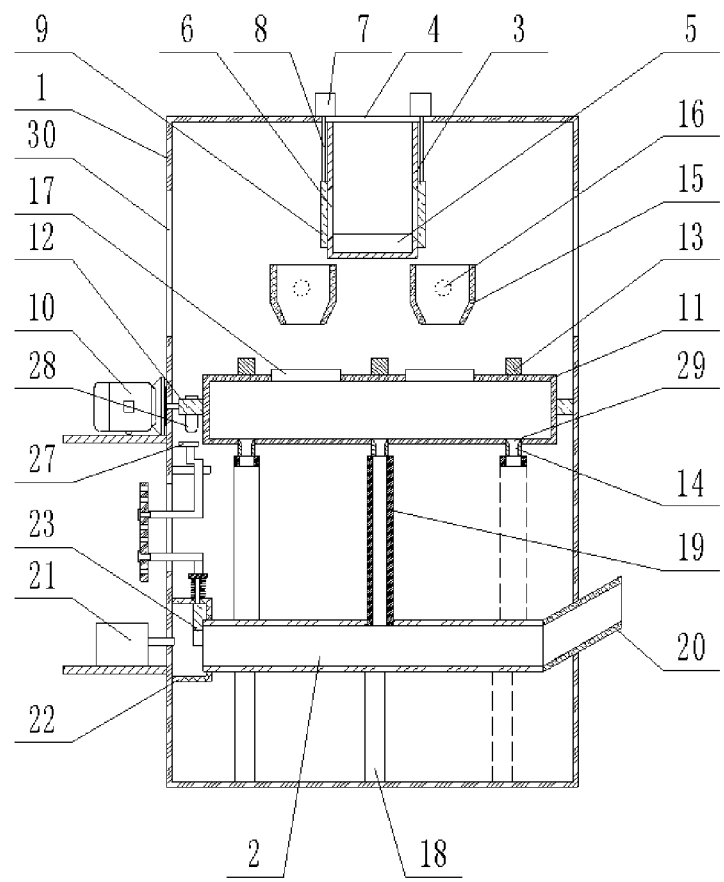
FIG. 3 is a perspective view of the top plate not in contact with the cam.
Figure 4:
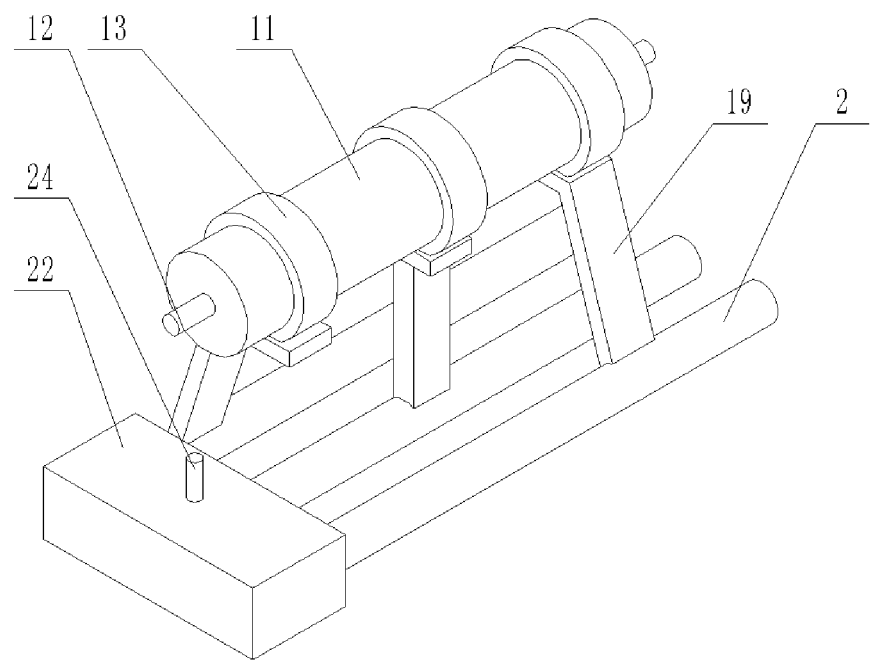
FIG. 4 is a perspective view of a delivery part.
Figure 5:
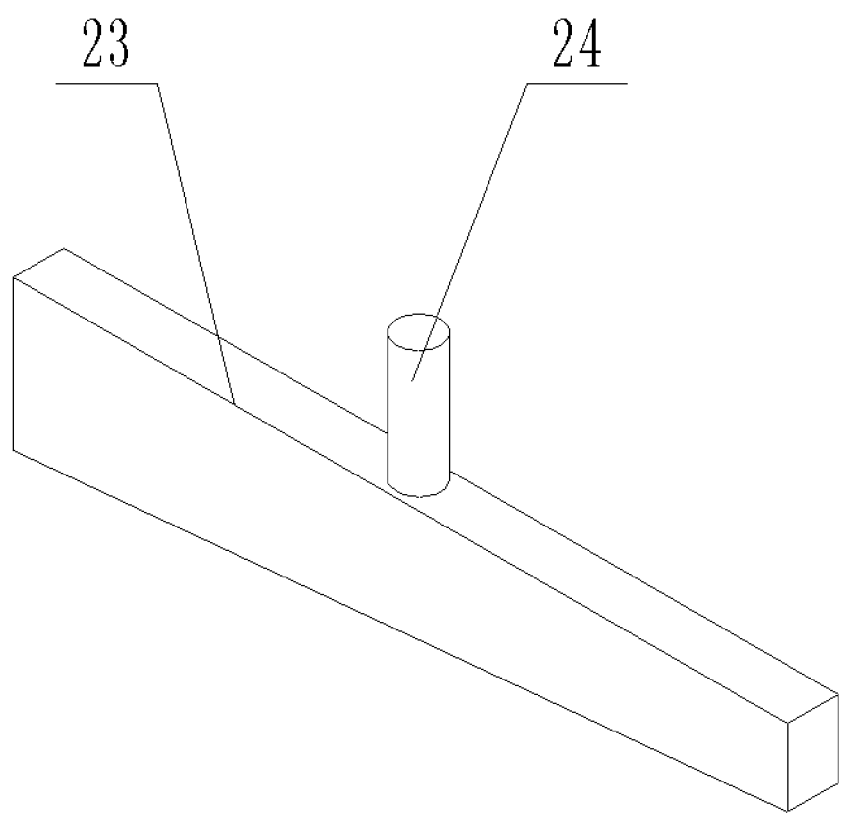
FIG. 5 is a perspective view of a blocking plate.

1—feeding box, 2—delivery tube, 3—storage box, 4—feeding port, 5—weighing scale, 6—discharge port, 7—movable cylinder, 8—pull rod, 9—baffle, 10—drive motor, 11—separating tube, 12—connecting rod, 13—separating ring, 14—separating hole, 15—funnel, 16—support rod, 17—sealing cap, 18—fixed rod, 19—connecting tube, 20—spray tube, 21—air supply pump, 22—gas collection box, 23—blocking plate, 24—drive rod, 25—push plate, 26—compression spring, 27—top plate, 28—cam, 29—groove, 30—operating opening, 31—first long rod, 32—second long rod, 33—adjusting rod, 34—locking bolt, 35—adjusting opening.

DETAILED DESCRIPTION OF EMBODIMENTS

The technical solutions in embodiments of the disclosure will be described clearly and completely in the following, in conjunction with the accompanying drawings in embodiments of the disclosure. Apparently, the described embodiments are only some of the embodiments of the disclosure, and not all of them. Based on the embodiments in the disclosure, all other embodiments obtained by those skilled in the art without making creative labor fall within the scope of protection of the disclosure.

In order to make the purpose, technical schemes, and advantages of the embodiments of the disclosure clearer, the disclosure will be detailed description below in combination with attached drawings and the embodiments.

The disclosure provides a smart agricultural automatic feeding device, includes a feeding box 1, a weighing part, a separating part, a delivery part and an air supply part. The weighing part is disposed in the feeding box 1 and connected to a top of the feeding box 1. The separating part is disposed below the weighing part and rotatably connected to an inner wall of the feeding box 1, and a feed end of the separating part is connected to a discharge end of the weighing part. The delivery part is disposed below the separating part, the delivery part includes a plurality of delivery tubes 2 arranged in parallel, the plurality of delivery tubes 2 are fixed to the inner wall of the feeding box 1, feed ends of the plurality of delivery tubes 2 are respectively connected to discharge ends of the separating part, and the feed ends of the plurality of delivery tubes 2 are configured to be arranged correspondingly to fish pond. The air supply part is disposed outside the feeding box 1, the air supply part is connected to the plurality of delivery tubes 2 through a pressurized part, and the pressurized part is in transmission connection with the separating part.

The fish feed enters the weighing part from the feeding box 1, a predetermined weight of fish feed is introduced into the separating part under the action of the weighing part, the separating part rotates and separates the fish feed, and the separated fish feed is introduced into the different delivery tubes 2. Due to the existence of the pressurized part, the air inlet volumes from the air supply part into the different delivery tubes 2 are different, thus moving distances of the fish feed sprayed from the different delivery tubes 2 are different, so as to improve the feeding range of the fish feed and facilitating the fish to eat. In the meantime, the pressure in the air supply part can be improved under the action of the pressurized part to increase the spray distance of the fish feed.

In an embodiment, the inlet air volume from the air supply part into the delivery tube 2 should be greater than the outlet air volume from the delivery tube 2, so that the fish feed can be sprayed out properly.

In an embodiment, the number of delivery tubes 2 is preferably set to three, so as to deliver the fish feed in different areas.

In an embodiment, the weighing part includes a storage box 3, a weighing scale two movable cylinders 7, poll rods 8 and baffles 9. The storage box 3 is fixed to an inner wall of the top of the feeding box 1 and connected to an outside of the feeding box 1 through a feeding port 4, the weighing scale 5 is disposed in the storage box 3, two walls of the storage box 3 are respectively provided with discharge ports 6, the movable cylinders 7 are fixedly connected to the top of the feeding box 1, the movable cylinders 7 are electrically connected to the weighing scale 5, the pull rods 8 are respectively fixedly connected to movable ends of the movable cylinders 7, the baffles 9 are respectively fixedly connected to ends of the pull rods 8, and the baffles 9 are disposed correspondingly to the discharge ports 6. The breeder pours the fish feed into the storage box 3 through the feeding port 4, there is no need to calculate the weight of the fish feed at this time, the weighing scale 5 can monitor the weight of the fish feed in the storage box 3 at any time. The movable cylinders 7 are activated when feeding is required, the movable cylinders 7 drive the baffles 9 to leave away from the discharge ports 6, the fish feed in the storage box 3 enters the separating part, the movable cylinders 7 are reset when the weight of the fish feed monitored by the weighing scale 5 reaches the preset value, and the feeding amount of the fish feed is controlled by blocking the discharge ports 6 with the baffles 9.

The operation of the movable cylinder 7 being controlled based on the weight of the fish feed monitored by the weighing scale 5 belongs to the related art and is not described too much here.

In an embodiment, the discharge ports 6 are disposed at the top of the weighing scale 5, and the discharge ports 6 are obliquely disposed to facilitate the flow of the fish feed.

In an embodiment, the separating part includes a drive motor 10, a separating tube 11, a connecting rod 12 and a plurality of separating rings 13. The drive motor 10 is fixedly connected to an outer wall of the feeding box 1. The separating tube 11 is rotatably connected to the feeding box 1. The connecting rod 12 is fixedly connected to an output end of the drive motor 10, and an end of the connecting rod 12 is fixedly connected to the separating tube 11. The plurality of separating rings 13 are fixedly connected to an outer wall of the separating tube 11, each of the plurality of separating rings 13 is provided with a separating hole 14, a feed end of the separating hole 14 is connected to the separating tube 11, and a discharge end of the separating hole 14 is connected to the delivery part. The drive motor 10 works to drive the separating tube 11 to rotate, the fish feed in the separating tube 11 enters into the plurality of delivery tubes 2 through the separating holes 14, the rotation of the separating tube 11 makes the fish feed less likely to block the separating holes 14, so as to allow the fish feed to be exported smoothly.

In an embodiment, the separating parts further includes funnels 15, support rods 16 and sealing caps 17, the funnels 15 are disposed between the storage box 3 and the separating tube 11, the funnels 15 are fixedly connected with an inner wall of the feeding box 1 through the support rods 16, and feed ends of the funnels 15 are disposed correspondingly with the discharge ports 6. The sealing caps 17 are detachably connected with the separating tube 11, discharge ends of the funnels 15 are connected to the separating tube 11 through the sealing caps 17. The funnels 15 introduce the fish feed discharged from the discharge ports 6 into the plurality of delivery tubes 2. When the fish feed is needed to be introduced into the separating tube 11, the sealing caps 17 are opened and the fish feed is introduced into the separating tube 11, then the sealing caps 17 are closed, so as to prevent the fish feed in the separating tube 11 from flowing out from the locations of the sealing caps 17.

In an embodiment, sidewalls of the feeding box 1 are provided with operating openings 30, the operating openings 30 are arranged correspondingly to the sealing caps 17. The existence of the operating openings 30 facilitates the installation and removal of the sealing caps 17 by the breeder.

In an embodiment, the number of funnels 15 and the sealing caps 17 is preferably set to two. This allows the fish feed to fall to different locations in the separating tube 11, with the aim of making the fish feed fall more evenly into the different discharge tubes 2.

In an embodiment, the delivery part further includes a plurality of fixed rods 18 and a plurality of connecting tubes 19. The plurality of delivery tubes 2 are fixed to the inner wall of the feeding box 1 through the plurality of fixed rods 18, the plurality of separating rings 13 are disposed correspondingly with the plurality of delivery tubes 19, the separating holes 14 of the plurality of separating rings 13 are respectively connected with the plurality of delivery tubes 2 through the plurality of connecting tubes 19, the plurality of delivery tubes 2 are rotatably connected with the plurality of separating rings 13. The fixed rod 18 plays the role of fixing the corresponding delivery tube 2, and the connecting tube 19 plays the role of connecting the separating hole 14 to the matching delivery tube 2 to allow the fish feed in the separating tube 11 to be directed into different delivery tubes 2.

In an embodiment, the delivery part further includes a plurality of spray tubes 20, the plurality of the spray tubes 20 are connected with discharge ends of the plurality of delivery tubes 2, discharge ends of the plurality of spray tubes 20 pass through the feeding box 1 and extend out of the feeding box 1, and the plurality of spray tubes 20 are aslant disposed. The discharge ends of the plurality of spray tubes 20 are aslant disposed upward, so as to increase the spray distance of the fish feed.

In an embodiment, the air supply part includes an air supply pump 21 and a gas collection 22. The air supply pump 21 is disposed on an outside of the feeding box 1. The gas collection box 22 is fixedly connected with the inner wall of the feeding box 1, an air inlet end of the air collection box 22 is connected with the air supply pump 21, air outlet ends of the air collection box 22 are respectively connected with the plurality of delivery tubes 2, the pressurized part is disposed at air inlet ends of the plurality of delivery tubes 2, and the pressurized part is configured to block the plurality of delivery tubes 2. The air supply pump 21 inflates the air into collection box 22, the air collection box 22 ventilated into the different delivery tubes 2, so as to drive the fish feed sprayed out of the plurality of delivery tubes 2.

In an embodiment, the pressurized part includes a blocking plate 23, a drive rod 24, a push plate 25, a compression spring 26, connecting rods, a top plate 27 and a cam 28. The blocking plate 23 is disposed in the air collection box 22 and the blocking plate 23 has a wedge-shaped structure. The drive rod 24 is fixedly connected to a top of the blocking plate 23, and an end of the drive rod 24 extends out of a top of the air collection box 22. The push plate 25 is fixedly connected to the end of the drive rod 24, the compression spring 26 is sleeved on the drive rod 24, two ends of the compression spring 26 are respectively fixedly to a bottom of the push plate 25 and the top of the air collection box 22, the top plate 27 is fixedly connected to a top of the push plate 25 through the connecting rods, the cam 28 is fixedly connected to the connecting rod, and the cam 28 is in sliding contact with a bottom of the top plate 27. The wedge-shaped structure of the blocking plate 23 makes the delivery tubes have different inlet air volumes, therefore the fish feed in the delivery tubes has different spray distance. When the cam 28 is in contact with the top plate 27, the push plate 25 is pressed downward to drive the blocking plate 23 to move downward, at this time, the air inlet volumes from the air collection box 22 into the plurality of delivery tubes 2 are reduced, and the pressure in the air collection box 22 is increased, at this time, the separating tube 11 introduces the fish feed into the plurality of delivery tubes 2 through the separating holes 14, the fish feed is gathered in the plurality of delivery tubes 2, when the cam 28 leaves the top plate 27, the blocking plate 23 moves upward under the action of the compression spring 26, the air outlet volumes of the plurality of delivery tubes 2 are increased, so as to drive the fish feed to be sprayed in a farther direction to improve the spray range of the fish feed.

In an embodiment, the connecting rods include a first long rod 31 and a second long rod 32, a bottom of the first long rod 31 is fixedly connected with a top of the push plate 25, the second long rod 32 is fixedly connected with the bottom of the top plate 27, a adjusting rod 33 is disposed between the first long rod 31 and the second long rod 32, the adjusting rod 33 is disposed at the outside of the feeding box 1, locking bolts 34 are threaded connected to the adjusting rod 33, the first long rod 31 and the second long rod 32 are respectively provided with locking holes matching the locking bolts 34, the first long rod 31 and the second long rod 32 are threaded connected with the adjusting rod 33 through the locking bolts 34. The first long rod 31 is connected with the second long rod 32 through the adjusting rod 33, therefore, the position of the blocking plate 23 can be adjusted by adjusting mounting positions of the first long rod 31 and the second long rod 32 on the adjusting rod 33, so as to achieve control of the air inlet volumes in the plurality of delivery tubes 2. When the second long rod 32 moves downward, the top plate 27 is no longer in contact with the cam 28, at this time the air inlet volumes in the plurality of delivery tubes 2 are fixed. Therefore, the spray method of the fish feed can be chosen by adjusting the mounting positions of the first long rod 31 and the second long rod 32 according to the actual needs.

In an embodiment, the sidewall of the feeding box 1 is provided with an adjusting opening 35, the first long rod 31 and the second long rod 32 are extending out of the feeding box 1 through the adjusting opening 35. The adjusting opening 35 is provided to facilitate the adjustment of the positions of the first long rod 31 and the second long rod 32.

In an embodiment, the separating tube 11 is provided with a plurality of grooves 29, and the plurality of grooves 29 are connected with the separating holes 14 of the plurality of separating rings 13. The existence of the plurality of grooves 29 make it difficult to accumulate the fish feed the separation tube 11, so as to improve the feeding effect of the fish feed.

Work Process:

The breeder pours the fish feed into the storage box 3 through the feeding port 4, the weighing scale can monitor the weight of the fish feed in the storage box 3 at any time. the movable cylinders 7 are activated when feeding is required, the movable cylinders 7 drive the baffles 9 leave away from the discharge ports 6, the fish feed is introduced to the separating tube 11 from the discharge ports 6 through the funnels 15, the movable cylinders 7 are reset when the weight of the fish feed monitored by the weighing scale 5 reaches the preset value, the discharge ports 6 are blocked through the baffles 9, then the sealing caps 17 are installed, the drive motor 10 works to drive the separating tube 11 to rotate, the fish feed in the separating tube 11 enters into the plurality of delivery tubes 2 through the separating holes 14, the air supply pump 21 works to inflate the air collection box 22, and ventilate into the different delivery tubes 2 through the air collection box 20, so as to drive the fish feed to be sprayed out of the plurality of delivery tubes 2. During this process, when the cam 28 is in contacted with the top plate 27, the push plate 25 is pressed downward to drive the blocking plate 23 move downward, at this time, the air inlet volumes from the air collection box 22 into the plurality of delivery tubes 2 are reduced, and the pressure in the air collection box 22 is increased, at this time, the separating tube 11 introduces the fish feed into the plurality of delivery tubes 2 through the separating holes 14, the fish feed is gathered in the plurality of delivery tubes 2, when the cam 28 leaves the top plate 27, the blocking plate 23 moves upward under the action of the compression spring 26, the air inlet volumes of the plurality of delivery tubes 2 are increased, so as to drive the fish feed to be sprayed in a farther direction to improve the spray range of the fish feed.

In the description of the disclosure, what needs to be understood is that terms such as "vertical", "horizontal", "up", "down", "front", "back", "left", "right", "top", "bottom", "inside", "outside", etc. indicate the orientation or position relationship based on the orientation or position relationship shown in the attached drawings. It is intended only to facilitate the description of the disclosure and not to indicate or imply that the devices or elements referred to must have a particular orientation, be constructed and operated in a particular orientation, and therefore cannot be construed as a limitation of the disclosure.

The above-described embodiments only describe the preferred way of the disclosure, do not limit the scope of the disclosure. Without departing from the spirit of the design of the disclosure, all kinds of deformations and improvements made to the technical solutions of the disclosure by those skilled in the art shall fall within the scope of protection determined by the claims of the disclosure.

What is claimed is:

1. An automatic feeding device, comprising:
a feeding box (1);
a weighing part, disposed in the feeding box (1) and connected to a top of the feeding box (1);
a separating part, disposed below the weighing part, wherein a feed end of the separating part is connected to a discharge end of the weighing part and the separating part is rotatably connected to an inner wall of the feeding box (1);
a delivery part, disposed below the separating part, wherein the delivery part comprises a plurality of delivery tubes (2) arranged in parallel, the plurality of delivery tubes (2) are fixed to the inner wall of the feeding box (1), feed ends of the plurality of delivery tubes (2) are respectively connected to discharge ends of the separating part, and discharge ends of the plurality of delivery tubes (2) are configured to be arranged correspondingly to a fish pond; and
an air supply part, disposed outside the feeding box (1); wherein the air supply part is connected to the plurality of delivery tubes (2) through a pressurized part, and the pressurized part is connected with the separating part;
wherein the separating part comprises:
a drive motor (10), fixedly connected to an outer wall of the feeding box (1);
a separating tube (11), rotatably connected to the feeding box (1);
a connecting rod (12), fixedly connected to an output end of the drive motor (10); and an end of the connecting rod (12) being fixedly connected to the separating tube (11); and
a plurality of separating rings (13), fixedly connected to an outer wall of the separating tube (11); wherein each of the plurality of separating rings (13) is provided with a separating hole (14), a feed end of the separating hole (14) is connected to the separating tube (11), and a discharge end of the separating hole (14) is connected to the delivery part;
wherein the air supply part comprises:
an air supply pump (21), disposed at an outside of the feeding box (1); and
an air collection box (22), fixedly connected to the inner wall of the feeding box (1); wherein an air inlet end of the air collection box (22) is connected with the air supply pump (21), air outlet ends of the air collection box (22) are respectively connected with the plurality of delivery tubes (2); and the pressurized part is disposed at air inlet ends of the plurality of delivery tubes (2), and the pressurized part is configured to block the plurality of delivery tubes (2);

wherein the pressurized part comprises:

a blocking plate (23), disposed in the air collection box (22), wherein the blocking plate (23) has a wedge-shaped structure;

a drive rod (24), fixedly connected to a top of the blocking plate (23); wherein an end of the drive rod (24) extends out of a top of the air collection box (22);

a push plate (25), fixedly connected to the end of the drive rod (24);

a compression spring (26), sleeved on the drive rod (24); wherein two ends of the compression spring (26) are respectively fixedly connected to a bottom of the push plate (25) and the top of the air collection box (22);

connecting rods;

a top plate (27), fixedly connected to a top of the push plate (25) through the connecting rods; and a cam (28), fixedly connected to the connecting rod (12), wherein the cam (28) is in sliding contact with a bottom of the top plate (27).

2. The automatic feeding device according to claim 1, wherein the weighing part comprises:

a storage box (3), fixed to an inner wall of the top of the feeding box (1); wherein the storage box (3) is connected to an outside of the feeding box (1) through a feeding port (4), and two walls of the storage box (3) are respectively provided with discharge ports (6);

a weighing scale (5), disposed in the storage box (3);

two movable cylinders (7), fixedly connected to the top of the feeding box (1), wherein the movable cylinders (7) are electrically connected to the weighing scale (5);

pull rods (8), fixedly connected to movable ends of the movable cylinders (7), respectively; and baffles (9), fixedly connected to ends of the pull rods (8), respectively; wherein the baffles (9) are disposed correspondingly to the discharge ports (6).

3. The automatic feeding device according to claim 2, wherein the separating part further comprises:

funnels (15), disposed between the storage box (3) and the separating tube (11);

support rods (16); wherein the funnels (15) are fixed to the inner wall of the feeding box (1) through the support rods (16), and feed ends of the funnels (15) are disposed correspondingly to the discharge ports (6);

sealing caps (17), detachably connected to the separating tube (11); wherein discharge ends of the funnels (15) are connected to the separating tube (11) through the sealing caps (17).

4. The automatic feeding device according to claim 1, wherein the delivery part further comprises: a plurality of fixed rods (18) and a plurality of connecting tubes (19); the plurality of delivery tubes (2) are fixed to the inner wall of the feeding box (1) through the plurality of fixed rods (18), the plurality of separating rings (13) are disposed correspondingly to the plurality of delivery tubes (2), the separating holes (14) of the plurality of separating rings (13) are respectively connected with the plurality of delivery tubes (2) through the plurality of connecting tubes (19), and the plurality of delivery tubes (2) are rotatably connected with the plurality of separating rings (13).

5. The automatic feeding device according to claim 4, wherein the delivery part further comprises: a plurality of spray tubes (20) connected with discharge ends of the plurality of delivery tubes (2), discharge ends of the plurality of spray tubes (20) pass through the feeding box (1) and extend out of the feeding box (1), and the plurality of spray tubes (20) are aslant disposed.

6. The automatic feeding device according to claim 1, wherein the separating tube (11) is provided with a plurality of grooves (29), and the plurality of grooves (29) are connected with the separating holes (14) of the plurality of separating rings (13).

\* \* \* \* \*